United States Patent
Chiba et al.

(10) Patent No.: US 6,254,503 B1
(45) Date of Patent: Jul. 3, 2001

(54) V-BELT DRIVEN PULLEY AND CONTINUOUSLY VARIABLE TRANSMISSION USING THE SAME

(75) Inventors: Nobutaka Chiba, Yokohama; Makoto Yoshida; Toshikazu Nanbu, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/430,128

(22) Filed: Oct. 29, 1999

(30) Foreign Application Priority Data

Oct. 30, 1998 (JP) .................................................. 10-310111

(51) Int. Cl.[7] .................................................. F16H 55/56
(52) U.S. Cl. .............................. 474/8; 474/174; 474/188; 29/894
(58) Field of Search ................................... 474/8, 11, 13, 474/12, 18, 17, 242, 244, 243, 201, 188, 189, 190, 184, 177, 174; 29/159 R, 894

(56) References Cited

U.S. PATENT DOCUMENTS

| | | | |
|---|---|---|---|
| 2,187,188 | 1/1940 | Whitcomb | 74/230.17 |
| 2,892,354 | 6/1959 | Amonsen | 74/230.17 |
| 4,781,660 | 11/1988 | Amataka et al. | 474/174 |
| 4,905,361 | 3/1990 | Morishita et al. | 29/892 |
| 4,947,533 | 8/1990 | Taniguchi et al. | 29/894 |
| 5,011,461 | 4/1991 | Brouwers | 474/188 |
| 6,068,564 | 5/2000 | Takahara | 474/12 |

FOREIGN PATENT DOCUMENTS

| | | |
|---|---|---|
| 889 262 | 1/1999 | (EP) . |
| 1 523 431 | 8/1978 | (GB) . |
| 196439 * | 8/1987 | (JP) . |
| 196444 * | 8/1987 | (JP) . |
| 229150 * | 9/1997 | (JP) . |
| 89603 * | 9/1997 | (JP) . |
| 9353 * | 1/1998 | (JP) . |

OTHER PUBLICATIONS

JIS B 0601–1994, "Surface Roughness—Definitions And Designation", *Japanese Industrial Standard*, pp. 1–26, (1994).
"C4 Automatic Transaxle" of New Model Car Manual Titled "Nissan Primera Primera Camino" Published in Sep., 1997.
JIS G 4052, "Structural Steels With Specified Hardenability Bands", pp. 542–561, (1979).
Patent Abstracts Of Japan; vol. 017, No. 558; (M–1493); Oct. 7, 1993, Pub. No. 05157146.
Patent Abstracts Of Japan; vol. 010, No. 105; (M–471); Apr. 19, 1986, Pub. No. 60238234.
Patent Abstracts Of Japan; vol. 017, No. 284; (M–1421); May 31, 1993, Pub. No. 05010405.
Patent Abstracts Of Japan; vol. 012, No. 179; (M–701); May 26, 1988, Pub. No. 62288763.
Patent Abstracts Of Japan; vol. 1998, No. 01; Jan. 30, 1998, Pub. No. 09229150.
Patent Abstracts Of Japan; vol. 012, No. 045; (M–667); Feb. 10, 1988, Pub. No. 62196444.

* cited by examiner

Primary Examiner—David A. Bucci
Assistant Examiner—Marcus Charles
(74) *Attorney, Agent, or Firm*—Foley & Lardner

(57) ABSTRACT

A pulley for use with an endless metal belt, including pulley halves rotatable about an axis. The pulley halves include truncated conical portions symmetrically opposed to each other and outer surfaces disposed on the truncated conical portions so as to be engageable with the belt. The outer surface of each pulley half has a centerline average roughness (Ra) of 0.1 to 0.5 $\mu$m, a Vickers hardness (Hv) of not less than 850 at a load of 200 g, and a microstructure with random fine irregularities in which a great number of recesses and projections are randomly located. A continuously variable transmission including the pulley is also disclosed.

15 Claims, 3 Drawing Sheets

V-BELT DRIVEN PULLEY AND CONTINUOUSLY VARIABLE TRANSMISSION USING THE SAME

BACKGROUND OF THE INVENTION

The present invention relates to a pulley useable in power transmissions of vehicles and industrial equipments, and more specifically to a pulley useable with a V-shaped driving belt in a continuously variable transmission (CVT) of vehicles and the CVT using the pulley.

Among the conventionally proposed power transmissions of vehicles and industrial equipments, there are known two types of transmissions adapted to variably transmit revolutions through an input shaft to an output shaft. One type of transmissions is a gear train type including a plurality of meshing gears and the other type is a belt-driven CVT including a driving belt.

The belt-driven CVT conventionally proposed includes an input pulley connected with a power source such as an engine, and an output pulley drivingly connected with the input pulley through an endless driving belt that is disposed therebetween and made of metal. The pulleys each define V-shaped grooves in which the driving belt is located. The width of the V-shaped groove of each pulley is variable in a direction of a revolution axis of the pulleys. The revolution of the input pulley is continuously variably transmitted to the output pulley depending on continuous variation of the widths of the V-shaped grooves of the pulleys. The CVT of this type is disclosed in "C4 Automatic Transaxle" of New Model Car Manual titled "NISSAN Primera Primera Camino" published in September, 1997.

There has conventionally been proposed a pulley for the belt-driven CVT. The pulley is made using a workpiece made of a case hardening steel. The workpiece is subjected to carburizing-quenching and tempering, and then to grinding so as to form on the outer circumferential periphery, contact surfaces that are in contact with the belt when the belt is placed in the V-shaped groove of the pulley.

There is also known an endless driving belt for the CVT, that includes a multi-layered ring composed of a plurality of ring-shaped bands laminated on one another and a plurality of V-shaped elements continuously arranged side-by-side along the circumferential direction of the multi-layered ring. Each of the V-shaped elements has side faces that are in contact with the contact surfaces of each of the pulleys upon the driving belt being engaged with the V-shaped groove of the pulley. The V-shaped element is produced from a workpiece made of a suitable steel selected from carbon steels or alloy steels used for machines, carbon tool steels, alloy tool steels and the like. In the production of the V-shaped elements, the workpiece is subjected to a suitable heat treatment such as quenching and tempering, carburizing-quenching and tempering, carbonitriding-quenching and tempering, induction-hardening and tempering, induction-hardening and the like. U.S. Pat. No. 5,011,461 discloses a driving belt used in the belt-driven CVT. The driving belt includes an endless carrier with transverse elements disposed on the endless carrier. The transverse elements are provided with side faces mating with contact surfaces of the pulleys that define the V-shaped grooves therebetween, respectively. The side faces are formed with ridges and grooves. The ridges and grooves extend straightly or slantly relative to the longitudinal direction of the endless carrier. This arrangement is provided for discharging oil and restraining slip caused by an oil film that is formed between the contact surface of each pulley and the side face of each transverse element.

SUMMARY OF THE INVENTION

There is a demand for providing a pulley for the belt-driven continuously variable transmission (CVT) that has a reduced size and can transmit an increased torque, for the purpose of reducing weight of vehicles and improving fuel economy in view of influences on environmental circumstances in feature.

Assuming that the conventionally proposed pulley is used in the belt-driven CVT and operated by a high-power engine with high torque output, the contact surfaces of the pulley that are in friction contact with the belt tend to be adhered to the opposed surface of the belt or peeled off. This is because the contact surfaces of the pulley have less wear-resistance resulting from selection of materials for the pulley and heat treatment as conventionally proposed. The adhesion or peel-off of the contact surfaces of the pulley will cause decrease in torque transmission performance of the CVT. In the case of using the pulleys made of materials selected and subjected to the heat treatment as conventionally roposed, it, therefore, will be required to increase distance between pulley-supporting shafts or change a configuration of the belt.

It is an object of the present invention to provide a pulley having highly wear-resistive outer surfaces brought into contact with a belt of the CVT, and thus being endurable even when used in a high-torque engine operation, and to provide a belt-driven CVT using the pulley.

It is a further object of the present invention to provide a pulley having a reduced size and a belt-driven CVT using the pulley.

According to one aspect of the present invention, there is provided a pulley for use with an endless metal belt, comprising:

pulley halves rotatable about an axis and relatively moveable in a direction of the axis, the pulley halves including truncated conical portions symmetrically opposed to each other and outer surfaces disposed on the truncated conical portions so as to be engageable with the endless metal belt, the outer surfaces being axially opposed to each other and sloped relative to the axis, the outer surfaces having a centerline average roughness (Ra) of 0.1 to 0.5 $\mu$m and a Vickers hardness (Hv) of not less than 850 at a load of 200 g.

According to another aspect of the present invention, there is provided a continuously variable transmission, comprising:

an input shaft;

an output shaft;

a first pulley disposed on the input shaft, the first pulley including first truncated conical ortions symmetrically opposed to each other and a first contact surface disposed on the first truncated conical portions;

a second pulley disposed on the output shaft, the second pulley including second truncated conical portions symmetrically opposed to each other and a second contact surface disposed on the second truncated conical portions; and an endless metal belt connecting the first pulley and the second pulley, the endless metal belt including a surface engaged with the first contact surface and the second contact surface;

at least one of the first contact surface and the second contact surface having a centerline average roughness (Ra) of 0.1 to 0.5 $\mu$m and a Vickers hardness (Hv) of not less than 850 at a load of 200 g.

According to a further aspect of the present invention, there is provided a process for making a pulley including a contact surface, comprising:

forming a preform from a workpiece made of alloy steel that contains at least manganese (Mn) and chromium (Cr);

subjecting the preform to carburizing-quenching and tempering so as to have an effective case depth of not less than 0.7 mm with respect to a reference Vickers hardness (Hv) of 550 at a load of 200 g;

grinding the preform to provide an outer surface; and shot-peening the outer surface of the preform to provide the contact surface with a centerline average roughness (Ra) of 0.1 to 0.5 μm and a Vickers hardness (Hv) of not less than 850 at a load of 200 g.

DETAILED DESCRIPTION OF THE INVENTION

Figure 1:
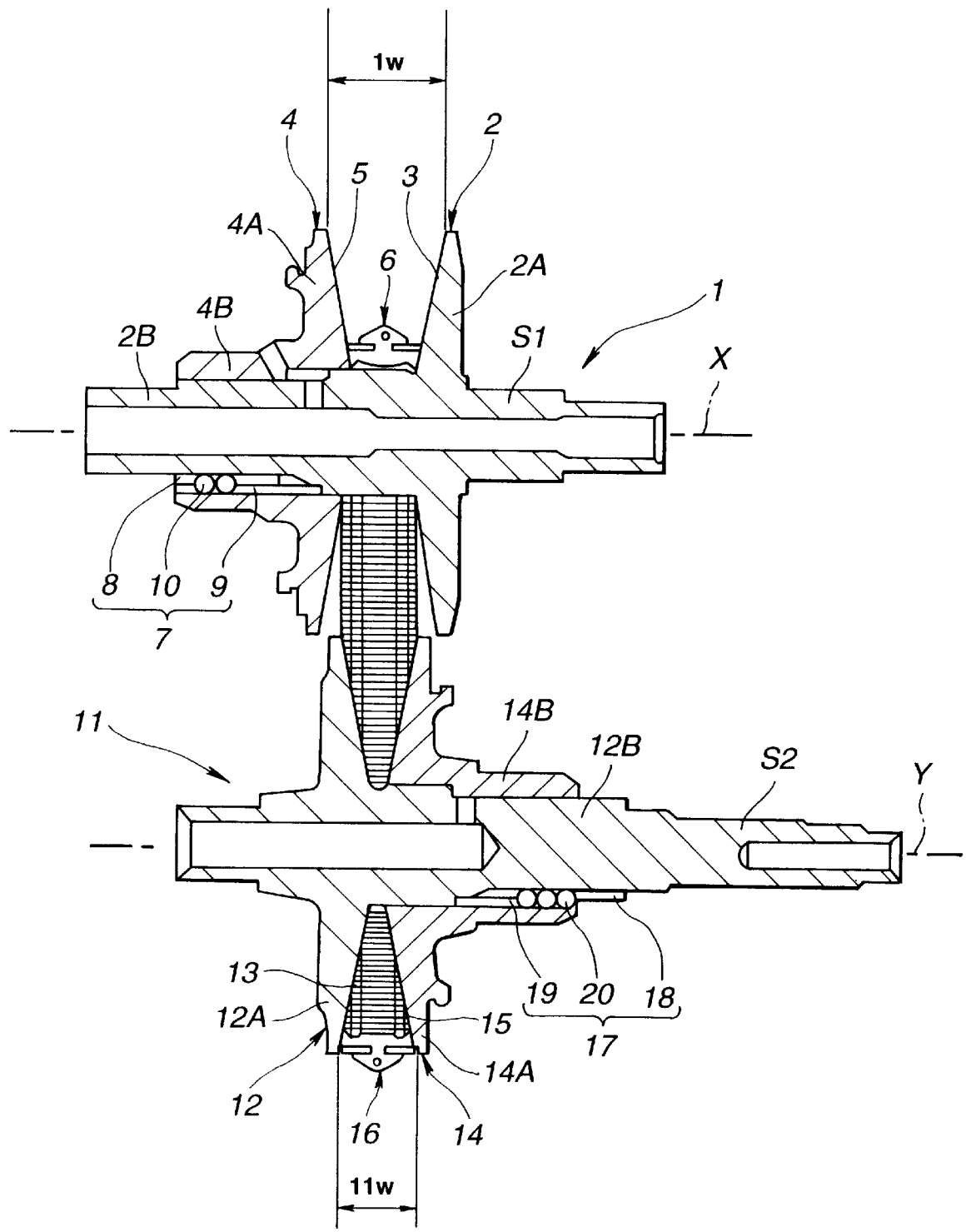
FIG. 1 is a section of a belt-driven continuously variable transmission (CVT) including an embodiment of a pulley according to the present invention.

Referring now to FIG. 1, there is shown a belt-driven continuously variable transmission (CVT) to which a pulley according to the present invention is used.

As illustrated in FIG. 1, the CVT includes an input pulley or sheave 1 disposed on an input shaft S1. The input pulley 1 is connected to a power source (not shown) such as an engine through the input shaft S1 and a clutch (not shown) connected with the input shaft S1. The input pulley 1 is rotatable about an axis X and includes a contact surface brought into contact with an endless metal belt 6 as explained later. Specifically, the input pulley 1 includes two pulley halves 2 and 4 rotatable about the axis X and relatively moveable in a direction of the axis X. The axially fixed pulley half 2 is formed integrally with the input shaft S1 and the axially moveable pulley half 4 is connected with the fixed pulley half 2. The fixed and moveable pulley halves 2 and 4 include truncated conical portions 2A and 4A symmetrically opposed to each other and hub portions 2B and 4B connected with the conical portions 2A and 4A. Each of the truncated conical portions 2A and 4A includes circumferential outer surfaces 3 and 5. The circumferential outer surfaces 3 and 5 are axially opposed to each other and sloped relative to the axis X. The outer surfaces 3 and 5 define the contact surface of the input pulley 1 and cooperate to define a V-shaped circumferential groove therebetween.

The CVT also includes an output pulley or sheave 11 rotatable about an axis Y and disposed on an output shaft S2. The output pulley 11 has a similar structure as the input pulley 1. The output pulley 11 has a contact surface brought into contact with the endless metal belt 6. The output pulley 11 includes pulley halves 12 and 14 rotatable about the axis Y and relatively moveable in a direction of the axis Y. The pulley half 12 is axially fixed and formed integrally with the output shaft S2 and the pulley half 14 is axially moveably connected with the fixed pulley half 12. The fixed and moveable pulley halves 12 and 14 include truncated conical portions 12A and 14A symmetrically opposed to each other and hub portions 12B and 14B connected with the conical portions 12A and 14A. Each of the truncated conical portions 12A and 14A includes circumferential outer surfaces 13 and 15 that are axially opposed to each other and sloped relative to the axis Y. The outer surfaces 13 and 15 define the contact surface of the output pulley 11 and cooperate to define a V-shaped circumferential groove therebetween.

At least one of the contact surface of the input pulley 1 and the contact surface of the output pulley 11 has a centerline average roughness (Ra) of 0.1 to 0.5 μm and a Vickers hardness (Hv) of not less than 850 at a load of 200 g. In this embodiment, the contact surface of the input pulley 1, namely, the axially opposed outer surfaces 3 and 5 of the fixed and moveable pulley halves 2 and 4 have the centerline average roughness (Ra) of 0.1 to 0.5 μm and the Vickers hardness (Hv) of not less than 850 at the load of 200 g. The centerline average roughness (Ra) is prescribed in the Japanese Industrial Standard (JIS) B0601-1994. In a case where the Ra of the outer surfaces 3 and 5 is less than 0.1 μm, the frictional force between the outer surfaces 3 and 5 and the side surfaces 6F of the blocks 6B of the belt 6 becomes undesirably low. If the Ra of the outer surfaces 3 and 5 is more than 0.5 μm, sufficient wear and abrasion resistance of the outer surfaces 3 and 5 that is aimed by the present invention cannot be exhibited. If the Hv of the outer surfaces 3 and 5 is less than 850, then the aimed sufficient wear and abrasion resistance of the outer surfaces 3 and 5 cannot be exhibited. Further, it is preferable that the outer surfaces 3 and 5 have at a depth of 3 to 5 μm from the outer-most portions thereof the Vickers hardness (Hv) of not less than 850, and more preferably not less than 900 at the load of 200 g. This can reduce or substantially completely restrain the wear that will be caused at the outer-most portions of the outer surfaces.

In addition, it is preferable that the contact surface, namely, the axially opposed outer surfaces 3 and 5 of the pulley halves 2 and 4 of the input pulley 1 has a maximum height (Ry) of 0.6 to 2.5 μm. This can prevent an increase in depth of wear that will occur when the surface roughness of the outer surfaces 3 and 5 become excessive. If the Ry is less than 0.6 μm, the frictional force between each outer surface 3 and 5 and the corresponding side surface 6F of each block 6B of the belt 6 becomes undesirably low. If the Ry is more than 2.5 μm, then the aimed sufficient wear and abrasion resistance of the outer surfaces 3 and 5 cannot be exhibited. The maximum height (Ry) also is prescribed in the Japanese Industrial Standard (JIS) B0601-1994.

Further, a compressive residual stress at the outer-most portion of each of the outer surfaces 3 and 5 of the pulley halves 2 and 4 of the input pulley 1 is not less than 1 GPa. This can further reduce the wear caused on the outer surfaces 3 and 5. If the compressive residual stress is less than 1 GPa, the aimed sufficient wear and abrasion resistance of the outer surfaces 3 and 5 cannot be exhibited.

Figure 2:
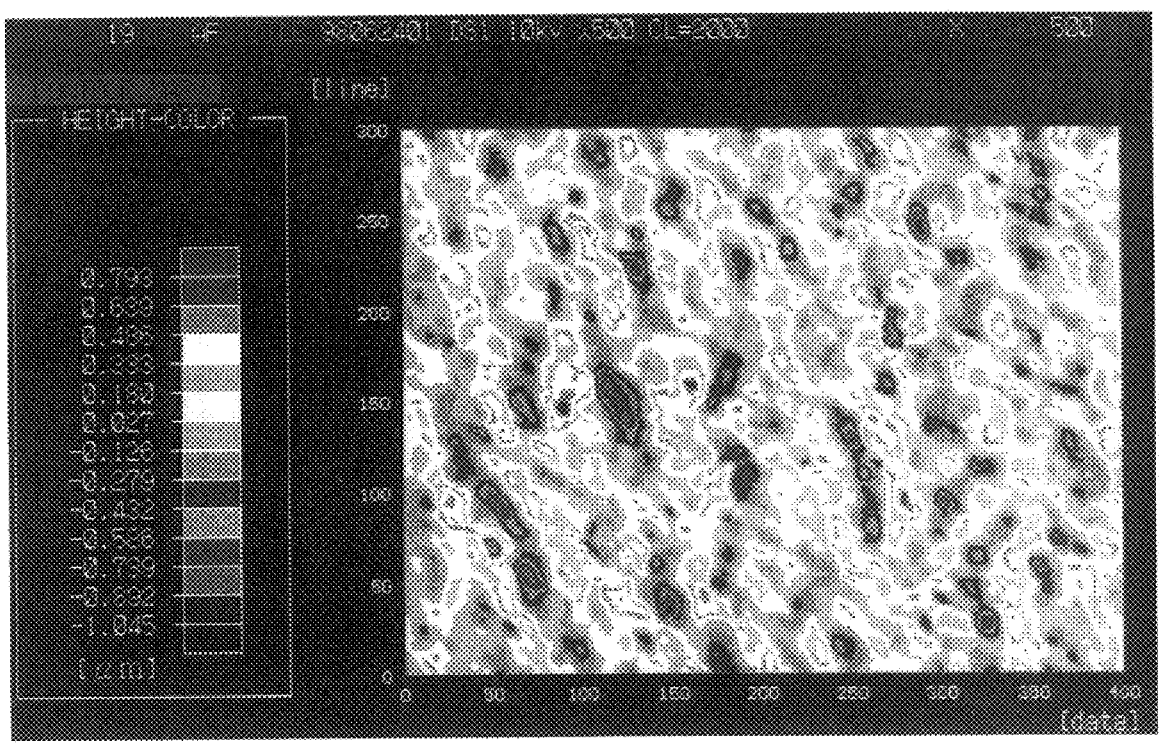
FIG. 2 is a contour map showing a microstructure of an outer surface of the pulley.

Furthermore, each of the outer surfaces 3 and 5 of the pulley halves 2 and 4 of the input pulley 1 has a microstructure with random fine irregularities in which a great number of recesses and projections are randomly located. The microstructure is shown in FIG. 2 and will be explained later by Examples. With provision of the microstructure, the wear of the contact surfaces 3 and 5 that results from adhesion to the belt 6 can be prevented.

Figure 3A:
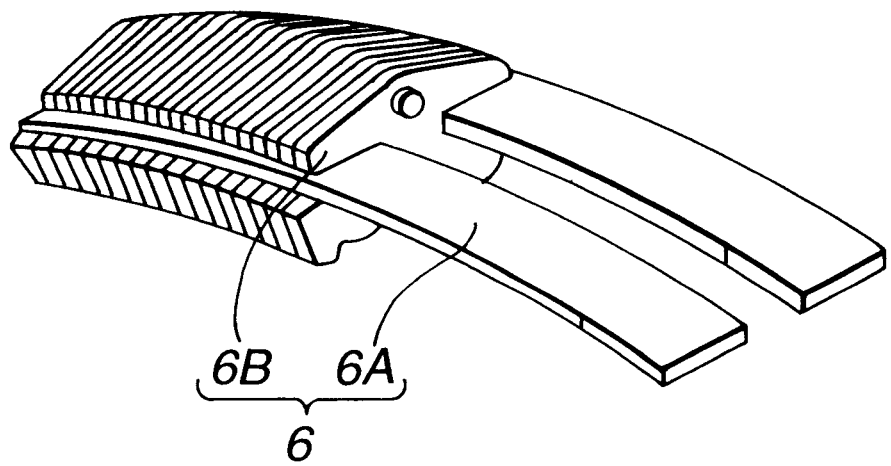
FIGS. 3A and 3B are perspective views showing a part of an endless driving belt for the CVT of FIG. 1 and an element composing the belt, respectively.
Figure 3B:
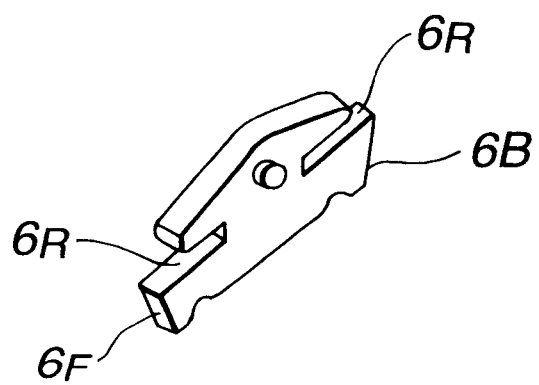

The endless metal belt 6 is disposed in the respective V-shaped circumferential grooves between the opposed outer surfaces 3 and 5 of the pulley halves 2 and 4 of the input pulley 1 and between the opposed outer surfaces 13 and 15 of the pulley halves 12 and 14 of the output pulley 11. The input pulley 1 and the output pulley 11 are operatively connected by the belt 6. Specifically, as illustrated in FIG. 3A, the metal belt 6 includes two spaced rings 6A and a plurality of generally V-shaped blocks 6B carried by the ring 6A. Each ring 6A has a multi-layered structure comprising a plurality of endless bands laminated on one another. The blocks 6B are arranged in series and closely contact with each other in the circumferential direction of the ring 6A. Each block 6B has opposed recesses 6R extending transversely relative to the circumferential direction of the ring 6A, as illustrated in FIG. 3B. The rings 6A are fitted to the recessed portions 6R. The block 6B has opposed side surfaces 6F disposed below the recessed portions 6R. The side surfaces 6F are in contact with the outer surfaces 3 and 5 of the pulley halves 2 and 4 of the input pulley 1 and the outer surfaces 13 and 15 of the pulley halves 12 and 14 of the output pulley 11 as shown in FIG. 1, when the belt 6 is placed in the V-shaped circumferential grooves between the pulley halves 2 and 4 of the input pulley and the pulley halves 12 and 14 of the output pulley 11.

The moveable pulley halves 4 and 14 of the input pulley 1 and the output pulley 11 are slidably supported by ball splines 7 and 17 on the hub portions 2B and 12B of the fixed pulley halves 2 and 12 of the input pulley 1 and the output pulley 11, respectively. The ball spline 7 on the input pulley side includes an axially extending groove 8 formed in an outer circumferential surface of the hub portion 2B, and an axially extending groove 9 formed in an inner circumferential surface of the hub portion 4B of the moveable pulley half 4. The grooves 8 and 9 each have a semi-circular section and cooperate to form an axial groove having a circular section, in which steel balls 10 are received. Similarly, the ball spline 17 on the output pulley side includes axially extending grooves 18 and 19 each having a semi-circular section. The grooves 18 and 19 are formed in an outer circumferential surface of the hub portion 12B of the fixed pulley half 12 and an inner circumferential surface of the hub portion 14B of the moveable pulley half 14, respectively. Steel balls are received in an axial groove formed by the semi-circular grooves 18 and 19.

The moveable pulley halves 4 and 14 of the input pulley 1 and the output pulley 11 are moved by a suitable actuating means such as hydraulic pressure along the hub portions 2B and 12B of the corresponding fixed pulley halves 2 and 12 thereof, respectively. An operating diameter of the belt 6 between the input pulley 1 and the output pulley 11 is continuously adjustable by continuously changing widths of the V-shaped circumferential grooves of the input pulley 1 and the output pulley 11. Owing to the continuous adjustment of the operating diameter of the belt 6, the rotation of the output pulley 11 can be continuously variably transmitted to the output shaft S2. In a case where the width 1$w$ of the V-shaped circumferential groove of the input pulley 1 is increased and the width 11$w$ of the V-shaped circumferential groove of the output pulley 11 is decreased, the rotation of the input pulley 1 is decelerated and transmitted to the output pulley 11. In this state, an engine speed is in a low range. Conversely, in a case where the width 1$w$ of the V-shaped circumferential groove of the input pulley 1 is decreased and the width 11$w$ of the V-shaped circumferential groove of the output pulley 11 is increased, the rotation of the input pulley 1 is accelerated and transmitted to the output pulley 11. The engine speed is in an overdrive range.

With the arrangement of the CVT as described above, the engine torque is transmitted from the input pulley 1 to the output pulley 11 via the belt 6 and then to gears, a differential, drive axles and wheels (not shown).

Although the pulley of the present invention is applied to the input pulley 1 in the above embodiment, it can be applied to the output pulley 11 and both of the input pulley 1 and the output pulley 11.

Further, the CVT of the present invention may be applied to a power transmission of vehicles and industrial equipments, and specially preferably to a transmission of vehicles.

A process for making the pulley including the contact surface that has the surface roughness and surface hardness as described above, now is explained. It should be noted that each of the input pulley 1 and the output pulley 11 can be produced by the similar process. The process is merely illustrative and it may not be limited thereto.

First, a workpiece for each pulley half of the pulley that is made of alloy steel containing at least manganese (Mn) and chromium (Cr) is prepared and formed into a preform having a generally pulley half shape explained in the above embodiment. The alloy steel may be of a known kind used for machine structures.

Next, the thus-obtained preform is treated by carburizing-quenching and tempering so as to have an effective case depth of not less than 0.7 mm with respective to a reference Vickers hardness (Hv) of 550 at a load of 200 g.

Subsequently, the heat-treated preform is subjected to grinding so as to be provided with an outer circumferential surface that acts as the contact surface of the pulley.

Then, the outer circumferential surface of the preform is subjected to shot-peening so as to have the centerline average roughness (Ra) of 0.1 to 0.5 $\mu$m and the Vickers hardness (Hv) of not less than 850 at the load of 200 g. In the shot-peening process, the outer circumferential surface of the preform also is provided with the microstructure having the random fine irregularities. Namely, a great number of recesses and projections are randomly located on the outer circumferential surface. Thus, each of the pulley halves are produced and then assembled into the integral pulley.

Material containing no Mn and Cr is unsuitable for the workpiece. This is because, in the case of using the workpiece made of the material containing no Mn and Cr, the hardenability is low and, therefore, the preform has an incompletely hardened structure. This tends to fail to achieve the above-described sufficient hardness of the contact surface of the pulley. Further, it is not preferable that the effective case depth of the preform be less than 0.7 mm with respective to the reference Vickers hardness (Hv) of 550. In the case of using such the preform, it is likely that the contact surface of the finished pulley cannot exhibit the aimed wear and abrasion resistance and other desired properties.

It is preferable that the shot-peening be conducted using an air-shot peening machine at a peening pressure of not less than 0.2 MPa and shots having a particle diameter of 0.03 to 0.2 mm and a Vickers hardness (Hv) of not less than 750 at a load of 200 g. By conducting the shot-peening process, it is possible to mass-produce a great number of the pulleys each including the contact surfaces having the increased wear and abrasion resistance in an industrial scale. In the shot-peening process, it is not preferable that the peening pressure be less than 0.2 MPa. If the shot-peening is conducted at the peening pressure of less than 0.2 MPa, the hardness of the outer-most portion of the outer surface and the compressive residual stress thereof are sometimes likely to be offset from the above-described desired range. In addition, various granular or spherical materials having the above-described hardness and particle diameter, typically steel balls, may be used as the shots. It is not preferable to use the shots having the particle diameter out of the above-described range. In the case of using the shots having a particle diameter of smaller than 0.03 mm, the kinetic energy of the shots is less. In the case of using the shots having a particle diameter of greater than 0.2 mm, the velocity of the shots is much lower. In both of the cases, the surface hardness and the compressive residual stress of the outer surface of the pulley obtained do not always lie in the above-described desired range.

EXAMPLES

The present invention is described in more detail by way of examples by referring to the accompanying drawings. However, these examples are only illustrative and not intended to limit a scope of the present invention.

Example 1

A pulley half was prepared according to the following procedures. A workpiece made of SCr420H (chromium steel) prescribed in the Japanese Industrial Standard (JIS) G 4052 was cut, hot-forged and subjected to rough-finishing so as to be formed into a generally pulley half-shaped preform explained in the above embodiment. The thus-obtained preform was subjected to heat treatment. In the heat treatment, the preform was carburized at a temperature of 920° C. in an atmosphere having a carbon potential (Cp) of 0.9% for 16 hours. The Cp represents the atmosphere composition capable of balancing the carbon content of a steel upon the carburizing. Subsequently, the carburized preform was subjected to diffusion at a temperature of 920° C. in an atmosphere having Cp of 0.7% for 2 hours. The diffused preform then was cooled at a temperature of 84020 C., quenched in an oil having a temperature of 80° C. and then tempered at a temperature of 170° C. for 2 hours. The heat-treated preform was ground with a machining allowance of 0.2 mm so as to be provided with the outer circumferential surface acting as the contact surface. The grinding was conducted such that the outer circumferential surface of the preform had the centerline average roughness (Ra) of 0.12 μm after grinding as indicated in Table.

The thus-formed outer circumferential surface of the preform was then subjected to shot-peening using an air shot-peening machine and steel balls as shots. The steel balls had a particle diameter of 0.05 mm and a Vickers hardness (Hv) of 750 at a load of 200 g. The air shot-peening machine had a peening nozzle having an opening diameter of 5 mm. The peening air pressure was 0.5 MPa and the peening time was 180 seconds. The distance between the nozzle and the outer circumferential surface of the preform was set to 100 mm. In order to conduct substantially uniform peening onto the outer circumferential surface of the preform, the preform was rotated and at the same time the nozzle was reciprocally moved between positions where the opening of the nozzle was directed to the radial inner and outer peripheries of the outer circumferential surface of the preform, respectively. The pulley half was thus produced.

Next, the thus-produced pulley half was subjected to measurements for surface hardness, surface roughness, compressive residual stress, effective case depth, and surface microstructure. The surface hardness was measured on the outer-most surface of the pulley half that was provided by buff-abrading off by 3 to 5 μm, and represented by a Vickers hardness (Hv) at a load of 200 g. The surface microstructure was measured using a scanning electron microscope (SEM) as explained later.

Then, a pulley including the thus-produced pulley halves as the fixed and moveable ones was subjected to an endurance test and measurement for depth of wear after the endurance test. Conditions of the endurance test were as follows.

input speed: 4000 rpm input torque: 30 kgf-m transmission gear ratio: 1.0 test time: 200 hours lubricating oil: "NISSAN CVT FLUID NS-1" produced by Showa Shell Sekiyu Co., Ltd.

Examples 2 and 3

Pulley halves were produced in the same manner as described in Example 1 except that the centerline average roughness (Ra) after grinding were 0.36 μm and 0.48 μm, respectively. The thus-produced pulley halves were measured in the same manner as described in Example 1, respectively. Pulleys including the thus-produced pulley halves were tested in the same manner as described in Example 1, respectively.

Example 4

A pulley half was produced in the same manner as described in Example 1 except that the centerline average roughness (Ra) after grinding was 0.33 μm and the particle diameter of the steel balls was 0.1 mm. The thus-produced pulley half was measured in the same manner as described in Example 1. A pulley including the thus-produced pulley halves was tested in the same manner as described in Example 1.

Example 5

A pulley half was produced in the same manner as described in Example 1 except that the centerline average roughness (Ra) after grinding was 0.31 μm and the peening air pressure was 0.25 MPa. The thus-produced pulley half was measured in the same manner as described in Example 1. A pulley including the thus-produced pulley halves was tested in the same manner as described in Example 1.

Examples 6 and 7

Pulley halves were produced in the same manner as described in Example 1 except that the centerline average roughness (Ra) after grinding were 0.33 μm and 0.11 μm, respectively, and the particle diameter of the steel balls was 0.03 mm. The thus-produced pulley halves were measured in the same manner as described in Example 1, respectively. Pulleys including the thus-produced pulley halves were tested in the same manner as described in Example 1, respectively.

Example 8

A pulley half was produced in the same manner as described in Example 1 except that the workpiece was made of SCM420H (chromium molybdenum steel) prescribed in the JIS G 4052, the centerline average roughness (Ra) after grinding was 0.34 μm and the particle diameter of the steel balls was 0.2 mm. The thus-produced pulley half was measured in the same manner as described in Example 1. A pulley including the thus-produced pulley halves was tested in the same manner as described in Example 1.

Example 9

A pulley half was produced in the same manner as described in Example 1 except that the workpiece was made of SCM420H prescribed in the JIS G 4052 and the centerline average roughness (Ra) after grinding was 0.35 $\mu$m. The thus-produced pulley half was measured in the same manner as described in Example 1. A pulley including the thus-produced pulley halves was tested in the same manner as described in Example 1.

Comparative Example 1

A pulley half was produced in the same manner as described in Example 1 except that the centerline average roughness (Ra) after grinding was 0.33 $\mu$m and the ground preform was not subjected to the subsequent shot-peening. The thus-produced pulley half was measured in the same manner as described in Example 1. A pulley including the thus-produced pulley halves was tested in the same manner as described in Example 1.

Comparative Example 2

A pulley half was produced in the same manner as described in Example 2 except that the workpiece was made of SCM420H prescribed in the JIS G 4052, the centerline average roughness (Ra) after grinding was 0.3 $\mu$m, the particle diameter of the steel balls was 0.5 mm and the peening air pressure was 0.5 MPa. The thus-produced pulley half was measured in the same manner as described in Example 1. A pulley including the thus-produced pulley halves was tested in the same manner as described in Example 1.

The results of the measurements and test of Examples 1 to 9 and Comparative Examples 1 and 2 are shown in Table.

Comparative Example 1 was not subjected to the shot-peening to thereby be inferior in surface hardness and compressive residual stress to the pulley halves of Examples 1 to 9. Also, the pulley half of Comparative Example 2 was treated by the shot-peening under inadequate conditions, i.e., the larger particle diameter of shots, so that the pulley half of Comparative Example 2 had the increased surface roughness and the reduced surface hardness as compared with the pulley halves of Examples 1 to 9.

FIG. 2 is a contour map showing the three-dimensional microstructure of the outer surface of the pulley half obtained in Example 1 as an example of the microstructure thereof indicated in Table.

The microstructure was measured using the SEM, ERA-8000 manufactured by Elionix Co., Ltd. The pulley half to be measured was cut into a piece having such a size as to be accommodatable in a vacuum chamber of the apparatus. The cut test piece was subjected to ultrasonic cleaning with n-hexane, and then measured under an accelerating voltage of 10 kV at a magnification of ×500.

The contour map of FIG. 2 was prepared by measuring data of the three-dimensional microstructure of the surface of the test piece at intervals of 0.6 $\mu$m in each of longitudinal and transverse directions thereof. Namely, the contour map covers the range of 0.6 $\mu$m×300 lines (=180 $\mu$m) in an ordinate axis and 0.6 $\mu$m×400 data (=240 $\mu$m) in an abscissa axis.

In FIG. 2, red-colored portions indicate large-height projections on the surface of the test piece; yellow portions indicate intermediate-height projections; and green-, blue- and dark blue-colored portions indicate valley portions. A

TABLE

| | | Surface Roughness After Grinding | Shot-peening Conditions | | Outer-most Surface Hardness | Surface Roughness | | Compressive Residual Stress | Effective Case Depth | Surface Microstructure | Wear Depth After Endurance Test ($\mu$m) |
| | | | Particle Diameter | Peening Air Pressure | | | | | | | |
| | Materials | Ra ($\mu$m) | (mm) | (MPa) | Hv (200 g) | Ra ($\mu$m) | Ry ($\mu$m) | (MPa) | (mm) | | |
|---|---|---|---|---|---|---|---|---|---|---|---|
| Example 1 | SCr420H | 0.12 | 0.05 | 0.5 | 920 | 0.15 | 0.78 | −1270 | 0.82 | random irregularities | 0 |
| Example 2 | SCr420H | 0.36 | 0.05 | 0.5 | 930 | 0.33 | 1.99 | −1220 | 0.81 | random irregularities | 0 |
| Example 3 | SCr420H | 0.48 | 0.05 | 0.5 | 930 | 0.45 | 2.44 | −1180 | 0.75 | random irregularities | 0 |
| Example 4 | SCr420H | 0.33 | 0.1 | 0.5 | 880 | 0.38 | 2.17 | −1080 | 0.83 | random irregularities | 1 |
| Example 5 | SCr420H | 0.31 | 0.05 | 0.25 | 890 | 0.29 | 1.88 | −1030 | 0.82 | random irregularities | 1 |
| Example 6 | SCr420H | 0.33 | 0.03 | 0.5 | 950 | 0.38 | 1.95 | −1380 | 0.79 | random irregularities | 0 |
| Example 7 | SCr420H | 0.11 | 0.03 | 0.5 | 970 | 0.12 | 0.72 | −1050 | 0.83 | random irregularities | 0 |
| Example 8 | SCM420H | 0.34 | 0.2 | 0.5 | 860 | 0.31 | 1.74 | −1250 | 0.95 | random irregularities | 2 |
| Example 9 | SCM420H | 0.35 | 0.05 | 0.5 | 910 | 0.31 | 1.74 | −1250 | 0.91 | random irregularities | 0 |
| Comparative Example 1 | SCr420H | 0.33 | — | — | 730 | 0.33 | 1.91 | −530 | 0.78 | circumferential grinding traces | 12 |
| Comparative Example 2 | SCM420H | 0.3 | 0.5 | 0.5 | 790 | 0.55 | 2.91 | −900 | 0.99 | random irregularities | 9 |

It was recognized from Table that each of the pulleys obtained in Examples 1 to 9 had the considerably increased wear and abrasion resistance while the pulleys obtained in Comparative Examples 1 and 2 had the reduced wear and abrasion resistance. This is because the pulley half of color strap below the title "HEIGHT-COLOR" shows a relationship between height and color in which the highest red color indicates a position higher by 0.793 $\mu$m than a reference position and the lowest dark blue color indicates a position lower by 1.045 $\mu$m than the reference position.

As seen from FIG. 2, the outer surface of the pulley half obtained in Example 1 had random fine irregularities. Further, it was confirmed that the outer surfaces of the pulley halves obtained in other Examples of the present invention also had the same fine structure as that of Example 1.

As be apparent from the above explanation, since the contact surface of the pulley of the present invention has the predetermined surface roughness, i.e., Ra of 0.1 to 0.5 μm and Ry of 0.6 to 2.5 μm, the predetermined hardness, i.e., Hv of not less than 850 at the outer-most surface, and the predetermined compressive residual stress, i.e., not less than 1 GPa at the outer-most surface, the contact surface of the pulley can exhibit the excellent wear and abrasion resistance and endure even upon high-torque engine operation. This can provide a belt-driven pulley having a compact size and also a continuously variable transmission using the pulley that has a reduced size as a whole.

This application is based on Japanese Patent Application No. 10-310111, filed on Oct. 30, 1998, the entire contents of which, inclusive of the specification, claims and drawings, are hereby incorporated by reference herein.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A pulley for use with an endless metal belt, comprising:
    pulley halves rotatable about an axis and relatively moveable in a direction of the axis, said pulley halves including truncated conical portions symmetrically opposed to each other and outer surfaces disposed on said truncated conical portions so as to be engageable with the endless metal belt, said outer surfaces being axially opposed to each other and sloped relative to the axis, said outer surfaces having a centerline average roughness (Ra) of 0.1 to 0.5 μm and a Vickers hardness (Hv) of not less than 850 at a load of 200 g.

2. A pulley as claimed in claim 1, wherein said outer surfaces have a surface roughness of a maximum height (Ry) of 0.6 to 2.5 μm.

3. A pulley as claimed in claim 1, wherein each of said outer surfaces has a compressive residual stress of not less than 1 GPa at an outer-most portion thereof.

4. A pulley as claimed in claim 1, wherein each of said outer surfaces has a Vickers hardness (Hv) of not less than 850 at a depth of 3 to 5 μm from an outer-most portion thereof.

5. A pulley as claimed in claim 4, wherein each of said outer surface has a Vickers hardness (Hv) of not less than 900 at the depth of 3 to 5 μm from the outer-most portion thereof.

6. A pulley as claimed in claim 1, wherein each of said outer surfaces have a microstructure with random irregularities in which recesses and projections are randomly located.

7. A continuously variable transmission, comprising:
    an input shaft;
    an output shaft;
    a first pulley disposed on said input shaft, said first pulley including first truncated conical portions symmetrically opposed to each other and a first contact surface disposed on said first truncated conical portions;
    a second pulley disposed on said output shaft, said second pulley including second truncated conical portions symmetrically opposed to each other and a second contact surface disposed on said second truncated conical portions; and
    an endless metal belt connecting said first pulley and said second pulley, said endless metal belt including a surface engaged with said first contact surface and said second contact surface;
    at least one of said first contact surface and said second contact surface having a centerline average roughness (Ra) of 0.1 to 0.5 μm and a Vickers hardness (Hv) of not less than 850 at a load of 200 g.

8. A continuously variable transmission as claimed in claim 7, wherein said at least one of said first contact surface and said second contact surface has a surface roughness of a maximum height (Ry) of 0.6 to 2.5 μm.

9. A continuously variable transmission as claimed in claim 7, wherein said at least one of said first contact surface and said second contact surface has a compressive residual stress of not less than 1 GPa at outer-most portions thereof.

10. continuously variable transmission as claimed in claim 7, wherein said at least one of said first contact surface and said second contact surface has a Vickers hardness (Hv) of not less than 850 at a depth of 3 to 5 μm from an outer-most portion thereof.

11. A continuously variable transmission as claimed in claim 7, wherein said at least one of said first contact surface and said second contact surface has a Vickers hardness (Hv) of not less than 900.

12. A continuously variable transmission as claimed in claim 7, wherein said at least one of said first contact surface and said second contact surface has a microstructure with random irregularities in which recesses and projections are randomly located.

13. A continuously variable transmission as claimed in claim 7, wherein each of said first and second pulleys includes pulley halves rotatable about an axis and relatively moveable in a direction of the axis, said pulley halves including axially opposed outer surfaces that define each of said first and second contact surfaces.

14. A process for making a pulley including a contact surface, comprising:
    forming a preform from a workpiece made of alloy steel that contains at least manganese (Mn) and chromium (Cr);
    subjecting the preform to carburizing-quenching and tempering so as to have an effective case depth of not less than 0.7 mm with respect to a reference Vickers hardness (Hv) of 550 at a load of 200 g;
    grinding the preform to provide an outer surface, and
    shot-peening the outer surface of the preform to provide the contact surface with a centerline average roughness (Ra) of 0.1 to 0.5 μm and a Vickers hardness (Hv) of not less than 850 at a load of 200 g.

15. A process as claimed in claim 14, wherein said shot peening is conducted using an air-shot peening machine at a peening pressure of not less than 0.2 MPa and shots having a particle diameter of 0.03 to 0.2 mm and a Vickers hardness (Hv) of not less than 750 at a load of 200 g.

* * * * *